United States Patent [19]

McLafferty

[11] 4,135,787
[45] Jan. 23, 1979

[54] UNSTABLE RING RESONATOR WITH CYLINDRICAL MIRRORS

[75] Inventor: George H. McLafferty, North Palm Beach, Fla.

[73] Assignee: United Technologies Corporation, Hartford, Conn.

[21] Appl. No.: 819,431

[22] Filed: Jul. 27, 1977

[51] Int. Cl.² .............................................. H01S 3/083
[52] U.S. Cl. ................................ 350/294; 331/94.5 C
[58] Field of Search ............... 331/94.5 CD; 350/294; 356/106 LR

[56] References Cited

U.S. PATENT DOCUMENTS 3,824,487  7/1974  Buczek ........................... 331/94.5 C Primary Examiner—William L. Sikes
Attorney, Agent, or Firm—Lawrence A. Cavanaugh

[57] ABSTRACT

An unstable ring resonator capable of providing an output beam having high power and high optical quality is disclosed. The unstable ring resonator is formed with a first region capable of providing transverse mode discrimination, beam magnification and improved beam quality, a second region capable of accommodating a gain medium and means for out coupling a beam of electromagnetic radiation to provide an output beam. Transverse mode discrimination is provided by the lowest loss mode characteristic of unstable resonators, improved mode discrimination and optical quality is obtained by utilizing mirrors having curved surfaces to focus the circulating electromagnetic radiation through spatial filters having line apertures and beam magnification is provided by the relative spacing of the curved surfaces. The unstable ring resonator is capable of providing a laser beam having a central portion with low beam intensity in the near field and having far field characteristics of high optical quality and high beam power.

15 Claims, 3 Drawing Figures

UNSTABLE RING RESONATOR WITH CYLINDRICAL MIRRORS

BACKGROUND OF THE INVENTION

1. FIELD OF THE INVENTION

The present invention relates to lasers which provide an output beam with high power and high optical quality and more particularly to unstable ring resonators having spatial filters.

2. DESCRIPTION OF THE PRIOR ART

Laser systems which provide an output beam at a very high power level such as those made possible with combustion driven chemical lasers are subject to various restraints which limit the actual output power from such a system and which limit the optical quality of the laser beam. An unstable ring resonator capable of simultaneous optimization of the transverse mode pattern of a beam within the resonator for high optical quality together with mode volume control for high power output is disclosed by Buczek et al in U.S. Pat. No. 3,824,487 entitled "Unstable Ring Laser Resonator" filed May 8, 1972 and held with the present application by common assignee. The resonator described therein involves separating the parameters which control the transverse mode discrimination of the resonator from those parameters which control the fractional output coupling and mode volume of the laser system. The unstable resonator includes a first region in which a beam of electromagnetic radiation passing therethrough is noncollimated and a second region in which a beam passing therethrough is collimated. The first region is formed with at least two curved reflection surfaces which permit the size of the beam to be changed within the resonator and is capable of providing a collimated beam to the second region. The energy density of the collimated beam is enhanced by passing the beam through a gain medium in the second region and a high power laser output beam is produced by diffractively coupling a portion of the enhanced beam out of the resonator as a collimated output beam having an annular shape. The remaining portion of the enhanced beam passes into the first region where it is magnified and recycled.

Another approach to the problem of obtaining high quality optical output beams having high power is disclosed by Freiburg et al in the U.S. Pat. No. 3,969,688 entitled "Traveling Wave Unstable Resonators for Radial Flow Lasers" filed Apr. 14, 1975 and held with the present application by a common assignee. The unstable ring resonator is formed having a centerline axis with a gain medium in the configuration of a thin wall cylinder disposed symmetrically about the centerline axis. The volume of the gain medium is determined by the maximum height of the cylindrical sheath which can be accommodated in the resonator without incurring superfluorescence. Since the volume of the gain medium can be increased by simply increasing the inside diameter of the cylindrical sheath, the volume is essentially unlimited and capable of providing output beams having high power. High optical quality of the beam results from the effective discrimination against high order transverse modes provided by a region of common resonance dominated by diffraction cross coupling.

A method of improving the optical quality of a laser beam produced by an unstable ring resonator is to provide spatial filtering of the beam within the resonator to filter out undesirable modes. A negative branch confocal optical system incorporated within a transverse mode discrimination region of a ring laser includes an optical system having a spherical mirror to focus a circulating beam to a diffraction limited spot and a second spherical mirror to collect the radiation expanding from the focused spot to provide a collimated beam to the active gain region of the resonator. The collimated beam has a diameter corresponding to the diameter of the second spherical mirror. A spatial filter having a circular aperture is located at the common focal plane of the optical system to provide filtering of unwanted high order modes. This concept is feasible for low power lasers where the power density in the focal point is sufficiently low to allow spatial filtering. However, in high power lasers, the power density at the focal point of the optical system is sufficiently high to destroy spatial filters made with known materials and utilizing known cooling techniques.

SUMMARY OF THE INVENTION

An object of the present invention is to provide a laser beam having both high power and good optical quality with an unstable ring resonator.

According to the present invention an unstable ring resonator comprises a first region, including a first filtering section comprising a first mirror and a second mirror, both having curved reflecting surfaces, and a first spatial filter positioned between the first and second mirrors, a second region, capable of accommodating a gain medium, having a turning mirror which cooperates with the first region to form an optical path of the unstable ring resonator and means for out coupling a portion of a circulating beam of electromagnetic radiation to provide an output beam. An embodiment of the present invention includes a second filtering section within the first region comprising a third mirror and a fourth mirror, both having curved reflecting surfaces, and a second spatial filter positioned between the third and fourth mirrors.

A primary feature of the present invention is the curved reflecting surfaces of the mirrors in the first filtering section for varying the dimension of the beam of radiation. The curved surface of the first mirror is capable of focusing the beam to a first focal line within the resonator. The second mirror is capable of collecting the radiation diverging from the first focal line to provide magnification of the beam in one dimension. A first spatial filter, having an aperture positioned at and aligned with the first focal line, is capable of providing improved optical quality in the dimension of the radiation focused to the first focal line. A primary feature of an embodiment of the present invention is the curved reflecting surfaces of the mirrors in a second filtering section within the first region for varying a second dimension of the beam of radiation. The curved reflecting surface of the third mirror in the second filtering section is capable of focusing the radiation to a second focal line within the resonator. The curved reflecting surface of the fourth mirror is capable of collecting the radiation diverging from the second focal line to provide magnification of the beam in a second dimension and to provide a collimated beam to the second region. A second spatial filter, having an aperture positioned at and aligned with the second focal line, is capable of providing improved optical quality in the dimension of the radiation focused to the second focal line. Additionally, a turning mirror within the second region is capable of directing the beam of radiation through the gain medium to the first region. A stripper mirror is capable of coupling the outer perimeter portion of the beam out of the resonator as a collimated output beam having a discontinuous cross-section and of passing the central portion of the circulating beam to the first region. Transverse mode discrimination, beam magnification and beam quality improvements occur within the first region and power extraction occurs in the second region. In the preferred embodiment the mirrors within the first region have cylindrical reflecting surfaces and the first and second focal lines are orthogonal to one another.

A primary advantage of the present invention is the high quality of the output beam resulting from the effective discrimination of high order modes by spatial filtering with an aperture. A primary advantage of an embodiment is the spatial filtering in two dimensions. Additionally, spatial filtering of circulating beams having high power is possible. The unstable ring resonator having spatial filters is capable of providing a laser beam having a large fundamental mode, good transverse mode discrimination, high optical quality and high power.

The foregoing and other objects, features and advantages of the present invention will become more apparent in the light of the following detailed description of the preferred embodiments thereof as illustrated in the accompanying drawing.

DESCRIPTION OF THE PREFERRED EMBODIMENT

Figure 1:
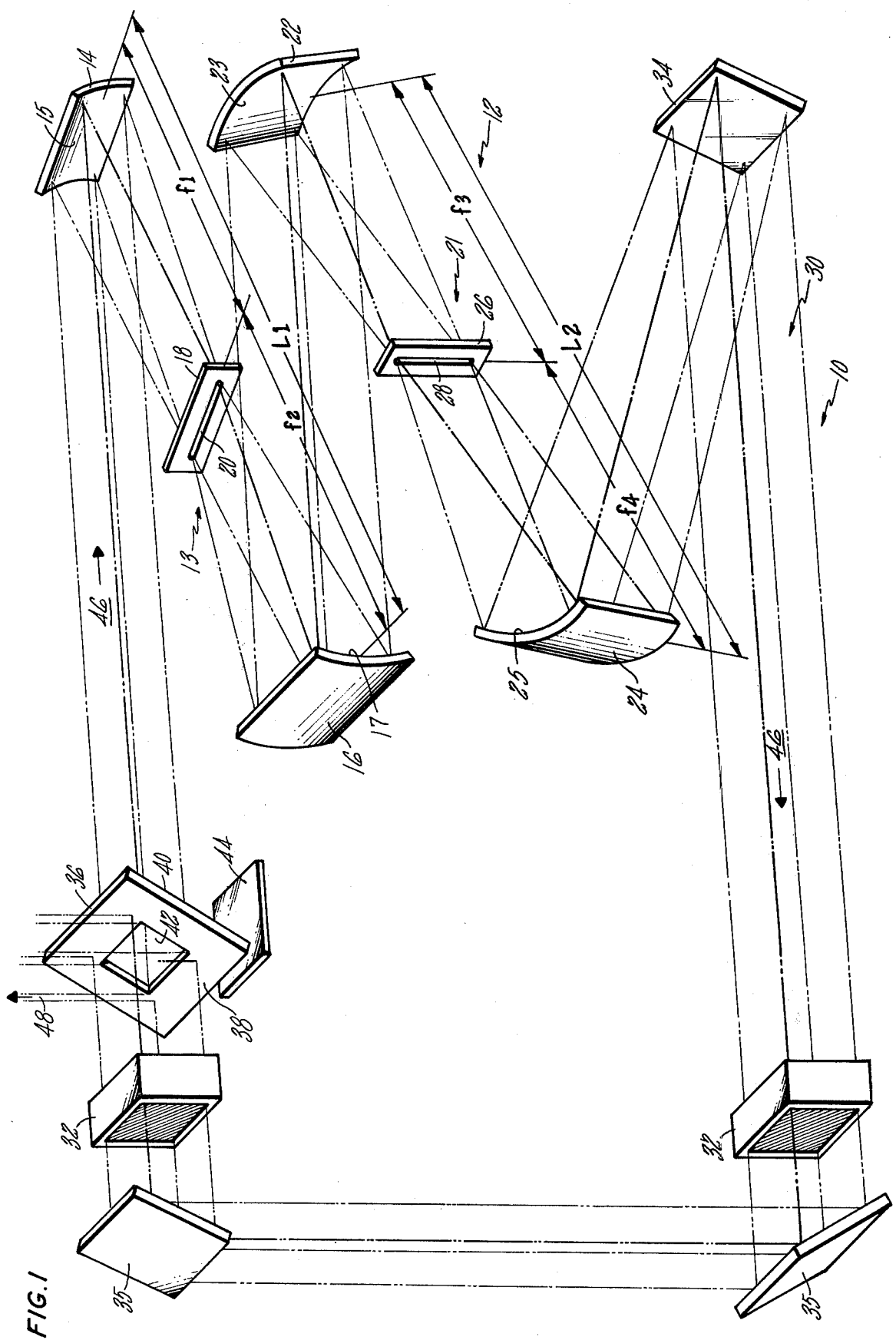
FIG. 1 is a simplified perspective view of an unstable ring resonator capable of providing spatial filtering to a beam of electromagnetic radiation circulating within the resonator.

A simplified unstable ring resonator 10 is shown in FIG. 1. A first region 12 includes a first filtering section 13 having a first mirror 14 with a cylindrical reflecting surface 15 located a distance $L_1$ from a second mirror 16 with a cylindrical reflecting surface 17, the first and second mirrors having focal lengths $f_1$ and $f_2$ respectively. A first spatial filter 18 having a first line aperture 20 is located between the first and second mirrors. A second filtering section 21, having a third mirror 22 with a cylindrical reflecting surface 23 located a distance $L_2$ from a fourth mirror 24 with a cylindrical reflecting surface 25, is also included in the first region. A second spatial filter 26 having a second line aperture 28 is located between the third and fourth mirrors. The third and fourth mirrors have focal lengths $f_3$ and $f_4$ respectively. A second region 30, capable of accommodating a gain medium 32, includes a turning mirror 34 capable of passing a beam of electromagnetic radiation from the first region into the second region and a pair of turning mirrors 35 capable of directing the beam through the second region to a stripper mirror 36, having a front reflective surface 38, a back reflective surface 40 and an aperture 42. The turning mirrors cooperate with the first and second filtering sections to define an optical path of the unstable ring resonator. A reversing mirror 44, positioned adjacent to the stripper mirror, enables the unstable ring resonator to be capable of having a beam of electromagnetic radiation 46 circulate in only the clockwise direction to produce an output beam 48.

In operation, the beam 46 circulating within the first region 12 is incident onto the first mirror 14 and is focused in one dimension to a first focal line at the focal length $f_1$ of the cylindrical surface 15. The focal length of a mirror being one half of the radius of curvature. Spatial filter 18 with line aperture 20 positioned at and aligned with the focal line of the first mirror provides improved optical quality to the beam 46 in the dimension of the beam focused to the line. The beam passes through the line aperture and expands in one dimension to the second mirror 16. The separation distance $L_1$ between the first and second mirrors and the focal lengths $f_1$ and $f_2$ of the first and second cylindrical surfaces respectively satisfy the confocal reltionship:

$$L_1 = f_1 + f_2 \qquad (1)$$

The beam incident on the second mirror is magnified in a first dimension with a magnification factor $M_1$ according to the relationship:

$$M_1 = f_2/f_1 \qquad (2)$$

where $f_2$ is greater than $f_1$.

When the confocal requirement of equation (1) is satisfied the beam reflected from the second mirror is collimated with a first dimension magnified by the factor $M_1$.

The collimated beam reflected by the second mirror passes to the third mirror 22 which focuses the beam in a second dimension to a second focal line such that in the preferred embodiment the first focal line and the second focal line are orthogonal. A second spatial filter 26 with line aperture 28 positioned at and aligned with the second focal line provides improved optical quality to the beam 46 in the dimension of the beam focused to a line. The orthogonal alignment of the spatial filters effectively filters out high order modes to provide a beam having improved optical quality. It is to be recognized that the line apertures could also have non-orthogonal orientations. The beam passing through the second focal line expands in the second dimension to the fourth mirror 24. The separation distances $L_2$ between the third and fourth mirrors and the focal lengths $f_3$ and $f_4$ of the third and fourth cylindrical reflecting surfaces respectively satisfy the confocal relationship:

$$L_2 = f_3 + f_4 \qquad (3)$$

The beam incident on the fourth mirror is magnified in the second dimension with a magnification factor $M_2$ according to the relationship:

$$M_2 = f_4/f_3 \qquad (4)$$

where $f_4$ is greater than $f_3$.

The beam expansion capabilities of the two filtering sections results in the cross-sectional area of the beam 46 incident onto the fourth mirror being magnified by the factor $M_1 M_2$.

The magnified collimated beam reflected by the fourth cylindrical mirror is incident onto the turning mirror 34 and passes into the second region 30 where the beam is amplified by energy exchange with the gain medium 32. Turning mirrors 35 direct the beam through the gain medium to the stripper mirror 36. The outer perimeter portion of the beam is diffractively out coupled from the resonator by the front reflecting surface 38 and forms the output beam 48 having a central portion with a low intensity in the near field. The central portion of the beam passes through the aperture 42 and is incident onto the first cylindrical mirror 14 and the process is repeated. A reversing mirror 44 in conjunction with the back surface 40 of the stripper mirror 36 is employed to suppress an undesirable beam which circulates in the counter clockwise direction through the ring resonator.

Figure 2:
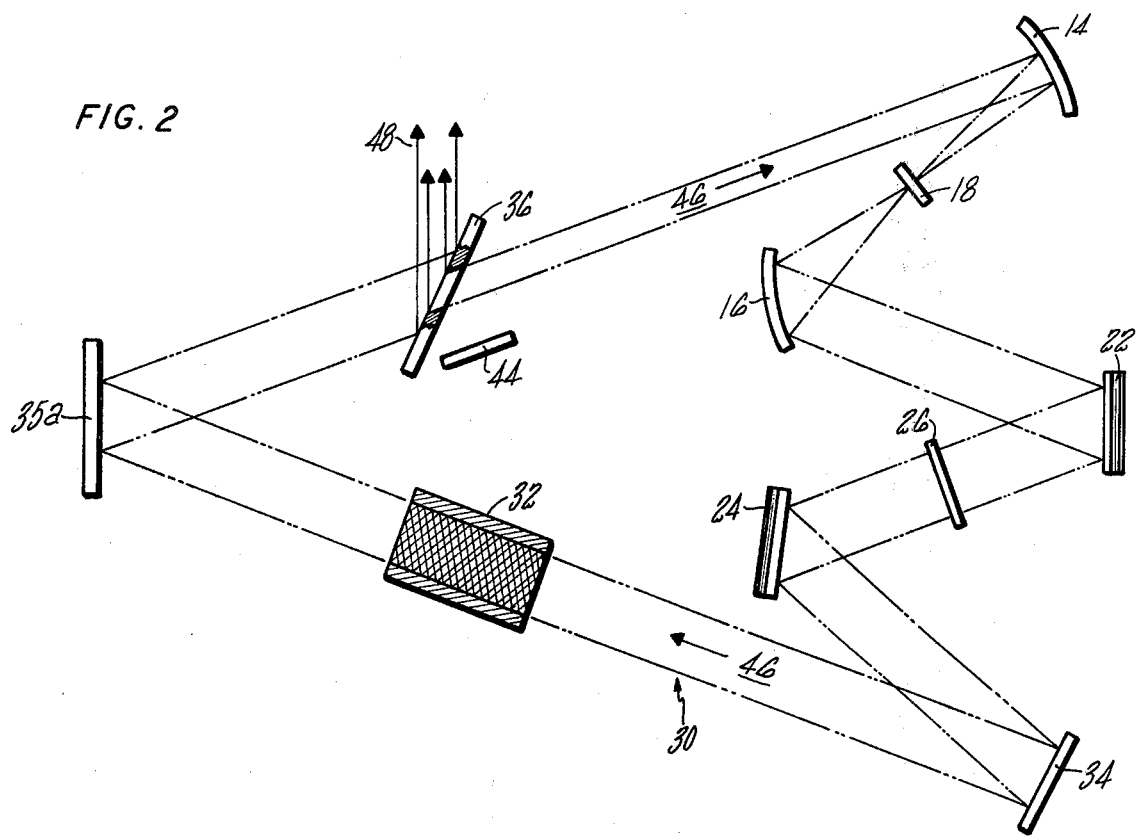
FIG. 2 is a simplified schematic diagram of a variation of the unstable ring resonator shown in FIG.1.

A simplified unstable ring resonator in accordance with the present invention is shown in FIG. 2 in which a single turning mirror 35a is employed to direct the beam circulating through the second region. Turning mirrors 34, 35a cooperate with the optical components in the first region to define the optical path of the unstable ring resonator.

The present invention is capable of providing improved optical quality to an output beam having high power by providing spatial filtering of the beam within the unstable ring resonator. Consider for example the power density resulting at the focal point of a spherical mirror according to the prior art. If ten kilowatts of power in a circulating beam of electromagnetic radiation having a wavelength of 4 microns and cross-sectional dimensions of $2.0 \times 8.0$ centimeter is incident onto a spherical mirror having a focal length of 100 centimeters, it will be focused to a spot approximately $0.01 \times 0.04$ centimeters producing a power density of approximately $2.5 \times 10^7$ watts per square centimeter. Although a focal point aperture in a spatial filter would not subject the filter material to this power density, it would be necessary to employ a material which must exist in fairly close proximity to the focal point. Typically, the power density which might impinge on the material defining the perimeter of the aperture would be one or two orders of magnitude less than the power density in the central portion of the aperture. In the example, the filter material would be required to withstand power densities of the order of $10^5$ to $10^6$ watts per square centimeter. In addition, to obtain the greatest improvement in beam quality, the aperture must be in the closed down position which results in higher power densities impinging on the material at the perimeter of the aperture. Laser beams having higher power levels will result in a corresponding increase in the power density at the aperture.

According to the present invention if ten kilowatts of power in a circulating beam of electromagnetic energy, having a cross-section of $2.0 \times 8.0$ centimeter and a wavelength of four microns, is incident onto the first cylindrical mirror having a focal length of one hundred centimeters, it will be focused to a first focal line having dimensions of approximately $2.0 \times 0.01$ centimeter, producing a power density at the first focal line of the order of $4.5 \times 10^5$ watts per square centimeter. The beam expands to the second cylindrical mirror and is directed to the third cylindrical mirror as a collimated beam having a cross-section of $2 \times 12$ centimeter. The beam is then focused by the third cylindrical mirror to a second focal line having dimensions of approximately $0.04 \times 12$ centimeter, producing a power density at the second focal line of the order of $2 \times 10^4$ watts per square centimeter. As previously noted, the power density at the perimeter of the aperture of a spatial filter would be reduced by one or two orders of magnitude. Thus power densities of the order of $10^4$ watts per square centimeter will be incident on the filter material which is within the limits of permissible power densities on filter materials which are cooled and have reflective surfaces.

The invention as shown in FIGS. 1 and 2 includes a pair of filter sections to provide spatial filtering in two orthogonal directions. It is to be noted that only one filter section need be employed when undesirable modes exist in only one plane. The condition may exist, for example, due to the possibility of "bouncing ball" modes off the walls of the cavity in a high power flowing gas laser for which there would be no analogy in the other plane because there are no walls in the other plane. In addition, some aerodynamic configurations result in density gradients perpendicular to the flow with little or no density gradients parallel to the flow. A single focal line may be adequate to suppress off-axis modes induced by the cross stream density gradients.

It is to be recognized that the second mirror 14 of the first filtering section 13 could employ a reflecting surface capable of focusing the beam expanding from the first focal line to a second focal line. The beam expanding from the second focal line would be incident onto a coupling mirror having a different radius of curvature in two directions to provide a collimated beam to the second region. This configuration would eliminate the requirement of the third and fourth cylindrical mirrors but would require a coupling mirror having a surface with a different radius of curvature in two directions which is difficult but not impossible to employ in a mirror.

Figure 3:
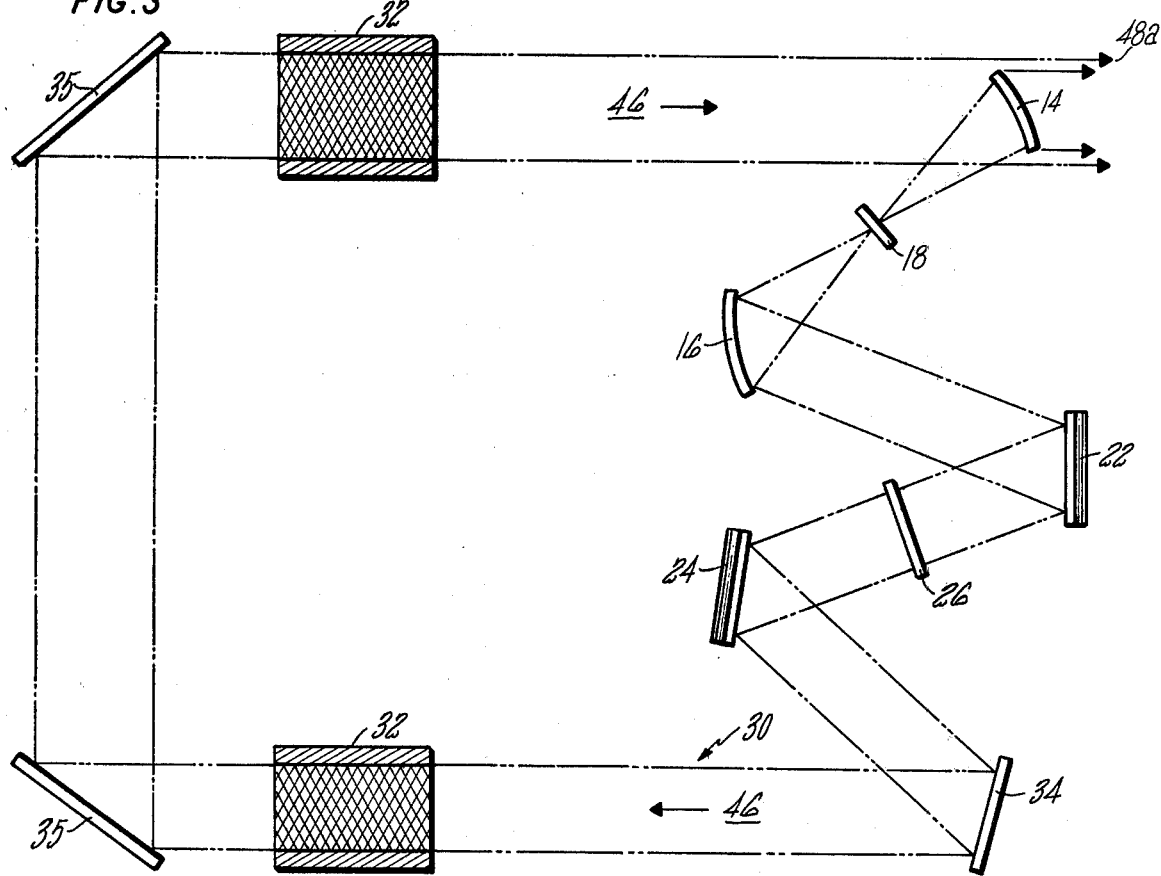
FIG. 3 is a simplified schematic diagram of an unstable ring resonator in accordance with the present invention in which an output beam is diffractively coupled out of the resonator around the perimeter of a mirror.

The present invention is not dependent upon the particular means of out coupling an output beam from the resonator. As shown in FIG. 3, the output beam 48a may be diffractively coupled out of the resonator around the outer perimeter of the first cylindrical mirror 14. In this embodiment the stripper mirror 36 and the reversing mirror 44 as shown in FIG. 1 would not be incorporated within the resonator. It is to be recognized that the output beam may be out coupled from the resonator around any of the mirrors shown in FIG. 3.

Additional filtering sections may be incorporated into the first region to provide improved optical quality of the circulating beam. The first pair of filtering sections will filter out many of the high order modes allowing the beam to be refocused to a smaller dimension. The smaller dimension of the refocused beam allows a second pair of filtering sections to have line apertures in a closed down position to obtain further improvement of the optical quality of the recirculating beam. It is to be recognized that a filtering section could also be located between the turning mirrors 35.

Although the invention has been shown and described with respect to preferred embodiments thereof, it should be understood by those skilled in the art that the foregoing and various other changes and omissions in the form and detail thereof may be made therein without departing from the spirit and scope of the invention.

Having thus described a preferred embodiment of my invention, that which I claim as new and desire to secure by Letters Patent of the United States is:

1. A ring resonator for providing an output beam of electromagnetic radiation having a central region with low intensity in the near field comprising:

a first region including a first filtering section having a first mirror and a second mirror, both with curved reflected surfaces, and a first spatial filter positioned between the first and second mirrors;

a second region, capable of accommodating a gain medium, including a turning mirror cooperating with the first filtering section to define an optical path of the ring resonator; and means for out coupling a portion of a beam of electromagnetic radiation to provide the output beam.

2. The invention in accordance with claim 1 wherein the curved reflecting surface of the first mirror has a focal length $f_1$ and the curved reflecting surface of the second mirror has a focal length $f_2$ wherein $f_1$ is less than $f_2$.

3. A ring resonator according to claim 2 wherein the curved reflecting surface of the first and second mirrors are separated from one another a distance $L_1$ according to the confocal relationship:

$$L_1 = f_1 + f_2$$

4. The invention in accordance with claim 1 wherein the first mirror has a cylindrical reflecting surface capable of focusing the beam of electromagnetic radiation to a first focal line and the second mirror has a cylindrical reflecting surface capable of collimating the beam expanding from the first focal line.

5. The invention in accordance with claim 1 wherein the means for out coupling a portion of the beam of electromagnetic radiation is a stripper mirror located within the second region.

6. The invention in accordance with claim 1 further including within the first region a second filtering section comprisng a third mirror and fourth mirror, both having curved reflecting surfaces, and a second spatial filter positioned between the third and fourth mirrors wherein the coupling mirror within the second region cooperates with the first and second filtering sections to define the optical path of the ring resonator.

7. The invention in accordance with claim 6 wherein the curved reflecting surface of the first mirror has a focal length $f_1$ and the curved reflecting surface of the second mirror has a focal length $f_2$ wherein $f_1$ is less than $f_2$ and the curved reflecting surface of the third mirror has a focal length $f_3$ and the curved reflecting surface of a fourth mirror has a focal length $f_4$ wherein $f_3$ is less than $f_4$.

8. The invention in accordance with claim 7 wherein the curved reflecting surfaces of the first and second mirrors are separated from one another a distance $L_1$ according to the confocal relationship:

$$L_1 = f_1 + f_2$$

and the curved reflecting surface of the third and fourth mirrors are separated from one another a distance $L_2$ according to the confocal relationship:

$$L_2 = f_3 + f_4$$

9. The invention in accordance with claim 6 wherein the first mirror has a cylindrical reflecting surface capable of focusing the beam of electromagnetic radiation to a first focal line, the second mirror has a cylindrical reflecting surface capable of collecting the radiation expanding from the first focal line to provide a collimated beam to the third mirror, the third mirror has a cylindrical reflecting surface capable of focusing the radiation to a second focal line and the fourth mirror has a cylindrical reflecting surface capable of collimating the radiation expanding from the second focal line.

10. The invention in accordance with claim 6 wherein the first filtering section is capable of magnifying the beam in one dimension and the second filtering section is capable of magnifying the beam in a second dimension wherein the first dimension and the second dimension are orthogonal to one another.

11. The invention in accordance with claim 6 wherein the first spatial filter and the second spatial filter have a line aperture.

12. The invention in accordance with claim 11 wherein the line aperture of the first spatial filter is aligned with and positioned at the first focal line and the line aperture of the second spatial filter is aligned with and positioned at the second focal line to provide spatial filtering of the beam in two dimensions.

13. A method for providing a laser beam having high power and high optical quality with a ring resonator having a gain medium including the steps of:

focusing a beam of electromagnetic radiation circulating within the resonator to a first focal line with a first mirror, filtering the beam with a first spatial filter having a line aperture positioned at and aligned with the first focal line to improve the optical quality of the beam in the dimension in which the beam is focused to the first focal line, magnifying the beam in the dimension in which the beam is focused to the first focal line into a collimated beam with a second mirror, amplifying the power of the collimated beam with the gain medium, coupling the outer diameter portion of the collimated beam out of the resonator to provide an output beam having high power and good optical quality, and passing the central portion of the collimated beam to the first mirror.

14. The method of claim 13 including the additional steps of:

focusing the collimated beam from the second mirror to a second focal line with a third mirror, filtering the beam with a second spatial filter having a line aperture positioned at and aligned with the second focal line to improve the optical quality of the beam in the dimension in which the collimated beam is focused to the second focal line, and magnifying the beam in the direction in which the collimated beam is focused to the second focal line into a collimated beam with a fourth mirror.

15. The method in accordance with claim 14 wherein the line aperture in the first and second spatial filters have orientations orthogonal to one another.

* * * * *

UNITED STATES PATENT AND TRADEMARK OFFICE
CERTIFICATE OF CORRECTION

PATENT NO. : 4,135,787
DATED : January 23, 1979
INVENTOR(S) : GEORGE H. McLAFFERTY It is certified that error appears in the above-identified patent and that said Letters Patent are hereby corrected as shown below:

Column 7, line 3: "reflected" should read --reflecting--.

Signed and Sealed this

Nineteenth Day of June 1979

[SEAL]

Attest:

RUTH C. MASON
Attesting Officer

DONALD W. BANNER
Commissioner of Patents and Trademarks